(12) United States Patent
Honea et al.

(10) Patent No.: US 6,904,069 B2
(45) Date of Patent: Jun. 7, 2005

(54) PARASITIC OSCILLATION SUPPRESSION IN SOLID STATE LASERS USING OPTICAL COATINGS

(75) Inventors: Eric C. Honea, Sunol, CA (US); Raymond J. Beach, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 226 days.

(21) Appl. No.: 09/752,848

(22) Filed: Dec. 29, 2000

(65) Prior Publication Data

US 2002/0118718 A1 Aug. 29, 2002

(51) Int. Cl.[7] .................................................. H01S 3/13
(52) U.S. Cl. ............................ 372/31; 372/33; 372/39; 372/40
(58) Field of Search ........................... 372/7, 24, 30, 372/31, 101, 33, 39, 99, 35, 68, 75, 70, 71, 66, 69; 375/75; 359/345, 350, 334; 385/33

(56) References Cited

U.S. PATENT DOCUMENTS

| | | | | |
|---|---|---|---|---|
| 3,515,897 A | * | 6/1970 | Culver ........................ 359/334 |
| 3,582,820 A | * | 6/1971 | Snitzer ........................ 372/68 |
| 3,982,201 A | * | 9/1976 | Rosenkrantz et al. ......... 372/75 |
| 4,207,541 A | * | 6/1980 | Karger et al. ................ 372/35 |
| 4,555,786 A | * | 11/1985 | Byer ............................ 372/70 |
| 4,642,809 A | * | 2/1987 | Petheram ..................... 372/66 |
| 4,681,396 A | * | 7/1987 | Jones .......................... 385/33 |
| 4,837,771 A | * | 6/1989 | Baer ........................... 375/75 |
| 4,891,815 A | * | 1/1990 | Ragle et al. ................. 372/44 |
| 4,912,713 A | * | 3/1990 | Langhans ..................... 372/66 |
| 5,084,889 A | * | 1/1992 | Tajima ......................... 372/39 |
| 5,239,549 A | * | 8/1993 | Tajima et al. ................ 372/39 |
| 5,299,220 A | * | 3/1994 | Brown et al. ................. 372/71 |
| 5,307,430 A | | 4/1994 | Beach et al. ................. 385/31 |
| 5,335,237 A | * | 8/1994 | Zapata ........................ 372/33 |
| 5,339,328 A | * | 8/1994 | Miura ......................... 372/70 |
| 5,856,060 A | * | 1/1999 | Kawamura et al. ......... 430/201 |
| 5,930,282 A | * | 7/1999 | Unternahrer et al. ......... 372/69 |
| 5,936,984 A | * | 8/1999 | Meissner et al. ............. 372/24 |
| 5,999,555 A | * | 12/1999 | Connors et al. .............. 372/99 |
| 6,039,632 A | | 3/2000 | Robertson ..................... 451/41 |
| 6,094,297 A | * | 7/2000 | Injeyan et al. ............. 359/345 |
| 6,115,396 A | * | 9/2000 | Connors ....................... 372/30 |
| 6,160,824 A | * | 12/2000 | Meissner et al. .............. 372/7 |
| 6,181,468 B1 | * | 1/2001 | Feng et al. ................. 359/350 |
| 6,222,872 B1 | * | 4/2001 | Beach et al. ................ 372/101 |
| 6,625,194 B1 | * | 9/2003 | Kaneda ....................... 372/71 |

FOREIGN PATENT DOCUMENTS

GB 2008314 * 11/1978 ............. H01S/3/05

* cited by examiner

Primary Examiner—Minsun Oh Harvey
Assistant Examiner—Dung (Michael) T Nguyen
(74) Attorney, Agent, or Firm—Eddie E. Scott; Alan H. Thompson

(57) ABSTRACT

A laser gain medium having a layered coating on at least certain surfaces of the laser gain medium. The layered coating having a reflective inner material and an absorptive scattering outside material.

8 Claims, 3 Drawing Sheets

PARASITIC OSCILLATION SUPPRESSION IN SOLID STATE LASERS USING OPTICAL COATINGS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to lasers. More specifically, it relates to parasitic oscillation suppression in solid-state lasers where the laser or pump beams are reflected off of a surface of the gain element.

2. State of Technology

Parasitic oscillations and amplified spontaneous emission (ASE) are undesired light amplification processes that critically limit the achievable energy storage in lasers and laser amplifiers. In many laser devices the laser and/or pump beams are reflected off of a polished face of the laser gain element. For instance, the zig-zag slab laser geometry relies on low-loss reflections of the laser beam and the object of many systems is to confine diode pump light by total internal reflection off of polished faces of the laser rod or slab. Parasitic oscillations or amplified spontaneous emission can also reflect off of these faces. It is generally necessary to avoid geometries where rays can be reflected with low loss and path lengths long enough to result in substantial amplification and depletion of the stored energy. In cases where these undesirable rays fill the entire gain volume, the entire stored energy could be depleted before useful extraction. In particular, some of these undesirable rays could be trapped in the laser volume via total-internal reflections, suffering little or no loss. This could prevent any useful gain from being developed and stored in the laser.

Lasers may be categorized as side pumped lasers and end pumped lasers. An example of a side pumped laser is shown in U.S. Pat. No. 5,335,237 to Luis E. Zapata, patented Aug. 2, 1994, assigned to The United States of America as represented by the United States Department of Energy. This patent provides the following description: "The present invention relates to an article for reducing or eliminating parasitic oscillation (PL) and amplified spontaneous emission (ASE) in solid state lasers. More specifically, it relates to a thin film attached to strategic facets of a solid state laser gain material to frustrate the total internal reflection of parasitic oscillation and amplified stimulated emission. In one design for a slab laser, the medium is optically excited through the two largest exposed planes which are parallel to the optical axis. An article for suppressing parasitic oscillations in a high average power solid state laser by combining an integral solid state slab laser gain medium with a thin film of higher index of refraction such that total internal reflections of oscillations are frustrated within the gain medium. The preferred embodiment of this invention is an edge cladding which suppresses ASE and parasitic oscillations and is formed of an absorbing metal (or semiconductor) dielectric multilayer-layer coating optimized for a broad range of incidence angles and resistant to the corrosive effects of a coolant such as water which is used in the forced convection cooling of the coating."

An example of an end pumped laser is shown in U.S. Pat. No. 5,936,984 to Meissner et al, patented Aug. 10, 1999, titled: Laser Rods with Undoped, Flanged End-caps for End-pumped Laser Applications. This patent provides the following description: "A flanged, at least partially undoped end-caps attached to at least one end of a laserable medium. Preferably flanged, undoped end-caps are attached to both ends of the laserable medium. Due to the low scatter requirements for the interface between the end-caps and the laser rod, a non-adhesive method of bonding is utilized such as optical contacting combined with a subsequent heat treatment of the optically contacted composite. The non-bonded end surfaces of the flanged end-caps are coated with laser cavity coatings appropriate for the lasing wavelength of the laser rod. A cooling jacket, sealably coupled to the flanged end-caps, surrounds the entire length of the laserable medium. Radiation from a pump source is focussed by a lens duct and passed through at least one flanged end-cap into the laser rod."

U.S. Pat. No. 6,039,632 to John Robertson, patented Mar. 21, 2000, assigned to Barr & Stroud Limited, provides the following description: "a solid state laser has an elongate slab of lasing material having a rectangular cross section with the lower face of the slab contacting a slab mount which is of a high thermal conductivity material. Energy to drive the lasing medium is provided by a flash lamp. Upper and lower faces of the slab are polished to an optically smooth finish so that light is able to propagate in a generally axial direction through the slab. Side faces of the slab are polished and then re-roughened to provide a finish with a surface damage zone comparable in depth to the wavelength of the lasing emission. For a lasing wavelength of one micrometer, the depth of surface damage is in the region of one micrometer."

SUMMARY OF THE INVENTION

The present invention is directed to reducing or eliminating parasitic oscillation in solid state lasers and related gain materials. This invention has relevance to laser gain elements having smooth surfaces other than those through which the laser light is intended to enter or exit the gain element. An optical coating is applied to the smooth surfaces. The smooth surfaces which are in contact with the applied optical coating serve to substantially reflect pump light that is introduced into the gain element and so keep the pump light confined within the gain element. The applied optical coating is designed to preferentially transmit spontaneous emission and amplified spontaneous emission out of the gain element and into the coating. The outer surface of the applied optical coating is designed to substantially scatter or absorb the radiation that reaches that surface so as to prevent it from re-entering the laser gain medium. The present invention has use for applications involving solid state lasers such as laser illumination, materials processing, power beaming, and laser weapons. Additional aspects, advantages, and features of the invention are set forth in part in the following description. Various aspects, advantages, and features of the invention will become apparent to those skilled in the art upon examination of the description and by practice of the invention.

BRIEF DESCRIPTION OF THE DRAWINGS

The accompanying drawings, which are incorporated into and form a part of the disclosure, illustrate embodiments of the invention, and together with the description, serve to explain the principles of the invention.

DETAILED DESCRIPTION OF THE INVENTION

Figure 1:
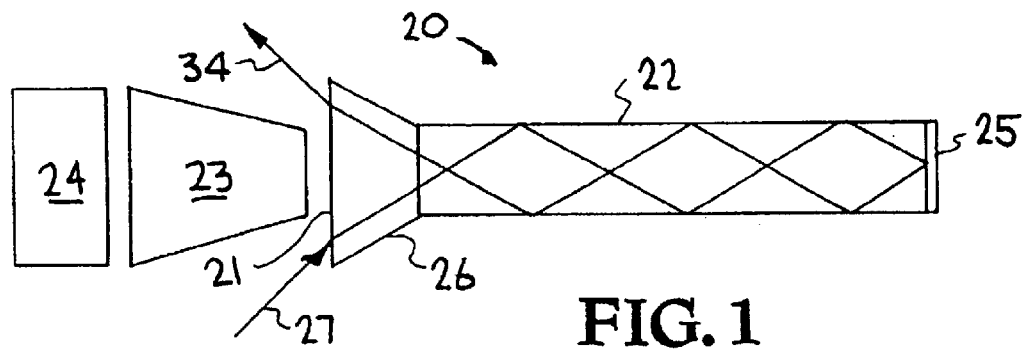
FIG. 1 is a schematic illustration of a diode-array end-pumped zigzag slab laser where the pump light is delivered to one end of the laser slab through a dichroic coating.
Figure 2:
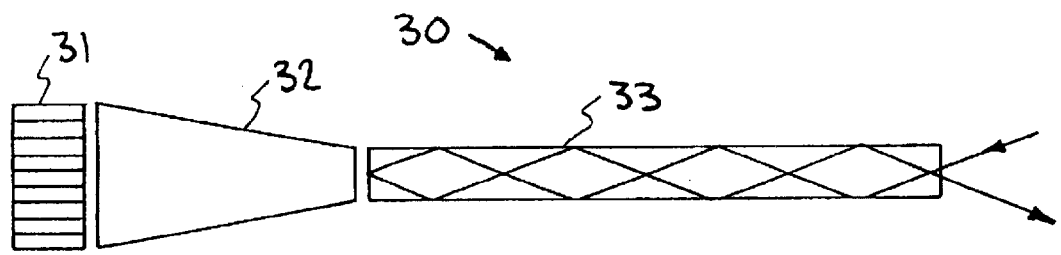
FIG. 2 is a top view of a zig-zag laser amplifier in which the beam to be amplified is passed into the slab through one face of the IBE and then double passes the slab prior to exiting the other face of the IBE.
Figure 3:
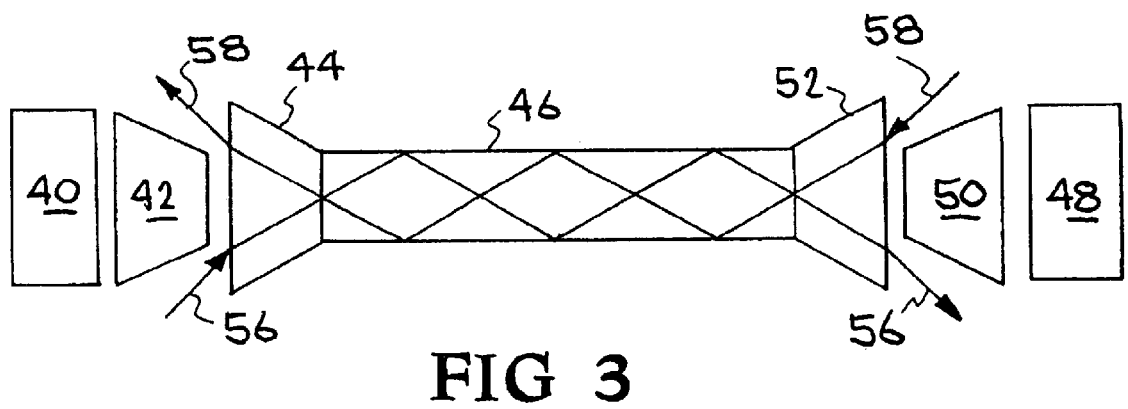
FIG. 3 illustrates an embodiment where the slab is pumped at both ends.

Referring now to the drawings, specific embodiments of the invention are shown. The detailed description of the embodiments, together with the general description of the invention, serve to explain the principles of the invention. FIGS. 1, 2, and 3, show embodiments of lasers incorporating the present invention. The lasers shown are end pumped lasers. Pump light is introduced into the end of the laser rod or slab and then ducted along the length of the rod or slab by total internal reflection. These reflections occur at the polished sides of the rod or slab when the pump light strikes them. As the pump light is ducted down the rod or the slab it is gradually absorbed. However the use of polished side surfaces to reflect the pump light may potentially make lasers of this type susceptible to parasitic oscillations and amplified spontaneous emission.

Zig-zag slab laser geometry relies on low-loss reflections of the laser beam. Many systems confine diode pump light by total internal reflection off of polished faces of the laser rod or slab. Parasitic oscillations or amplified spontaneous emission can also reflect off of these faces. It is generally necessary to avoid geometries where rays can be reflected with low loss and path lengths long enough to result in substantial amplification and depletion of the stored energy. In cases where these undesirable rays fill the entire gain volume, the entire stored energy could be depleted before useful extraction. In particular, some of these undesirable rays could be trapped in the laser volume via total-internal reflections, suffering little or no loss. This could prevent any useful gain from being developed and stored in the laser.

Lasers to date have solved this problem by applying a ground finish to reduce the specular reflectivity, or applying an absorbing film or layer to some of the surfaces of the laser gain element. This limits the design options since the limited reflectivity can impact pump delivery or possible laser geometries. The present invention enables surfaces to have low specular reflectivity for high angles which would be sampled by parasitic oscillations but maintain high reflectivity for low near grazing incidence angles useful for confining pump light or reflecting the laser beam.

Referring now to FIG. 1 a diode-array end-pumped zigzag slab laser, generally designated by the reference numeral 20, is shown. The laser 20 illustrated in FIG. 1 includes a laser slab 22 using a lens duct 23 to deliver pump light from diode array 24. Laser slab 22 includes a highly reflective coating 25 on one end. An intermediate beam extractor (IBE) 26 is located between lens duct 23 and an end 21 of laser slab 22. The intermediate beam extractor acts as a continuation of the lens duct which serves to deliver the pump light from a large diode laser array to a smaller cross-sectioned laser slab. Various embodiments of the lens duct usable in the present invention are disclosed in U.S. Pat. No. 5,307,430, titled "Lensing Duct", incorporated herein by reference. Other related disclosure of hollow lensing ducts may be found in U.S. patent application Ser. No. 09/182155, filed Oct. 21, 1998 titled "Hollow Lensing Duct," is incorporated herein by reference. A laser beam 27 is directed through IBE 26 into laser slab 22 through end 21. After undergoing total internal reflection within laser slab 22, laser beam 27 reflects from the highly reflective coating 25, to exit from the laser slab 22 and the IBE 26 as amplified laser beam 34.

In the laser 20, the pump light is delivered to one end 21 of the laser slab 22 through a dichroic coating. This dichroic coating is highly reflecting for the laser wavelength but highly transmitting for the pump wavelength. The laser beam 27 reflects off of the polished surfaces sides for "bounces" in the laser slab 22. Provided the material external to this surface has a lower index of refraction, the laser light can be reflected by total internal reflection resulting in virtually no loss. In addition, the pump light may reflect off of these surfaces as well as the polished surfaces of the slab parallel to the surface of the plot. Similarly, an edge-pumped slab laser would bring the pump light into the gain element through the two other faces of the slab, but could still rely on total internal reflection to confine the pump light as it is gradually absorbed.

Alternate embodiments for end pumping may use novel configurations to bring in the pump light while still relying on the reflections of the polished slab slides. The configuration of FIG. 2 shows a top view of a zig-zag laser amplifier, generally designated by the reference numeral 30, in which the beam to be amplified is passed into the slab through one face of an IBE and then double passes the slab prior to exiting the other face of the IBE. This particular configuration is pumped at one end and may have a HR coating applied to the other end, or alternatively, the laser beam could exit the slab and be redirected back into the slab with external optics. Specifically, light from laser diode array 31 propagates through lens duct 32 and an IBE to optically pump laser slab 33. A laser beam is directed through IBE into laser slab 33. The IBE is located between the lens duct 32 and slab 33 in the manner shown in FIG. 1. After undergoing total internal reflection within laser slab, the laser beam reflects from the highly reflective coating, to exit from the laser slab and the IBE as amplified laser beam.

FIG. 3 shows an embodiment where the slab is pumped at both ends. Pump radiation from diode array propagates through lens duct and IBE into laser slab. Pump radiation from diode array propagates through lens duct and IBE into laser slab. In this configuration the laser beams and which are to be amplified in the zig-zag slab enter and exit the slab after a single pass through the laser slab. Pump radiation from diode array 40 propagates through lens duct 42 and IBE 44 into laser slab 46. Pump radiation from diode array 48 propagates through lens duct 50 and IBE 52 into laser slab 46. In this configuration the laser beams 56 and 58 which are to be amplified in the zig-zag slab enter and exit the slab after a single pass through the laser slab 46. This embodiment in particular has applicability to many quasi-three level laser schemes in which intense bleach wave pumping is a prerequisite to efficient laser operation.

Figure 4:
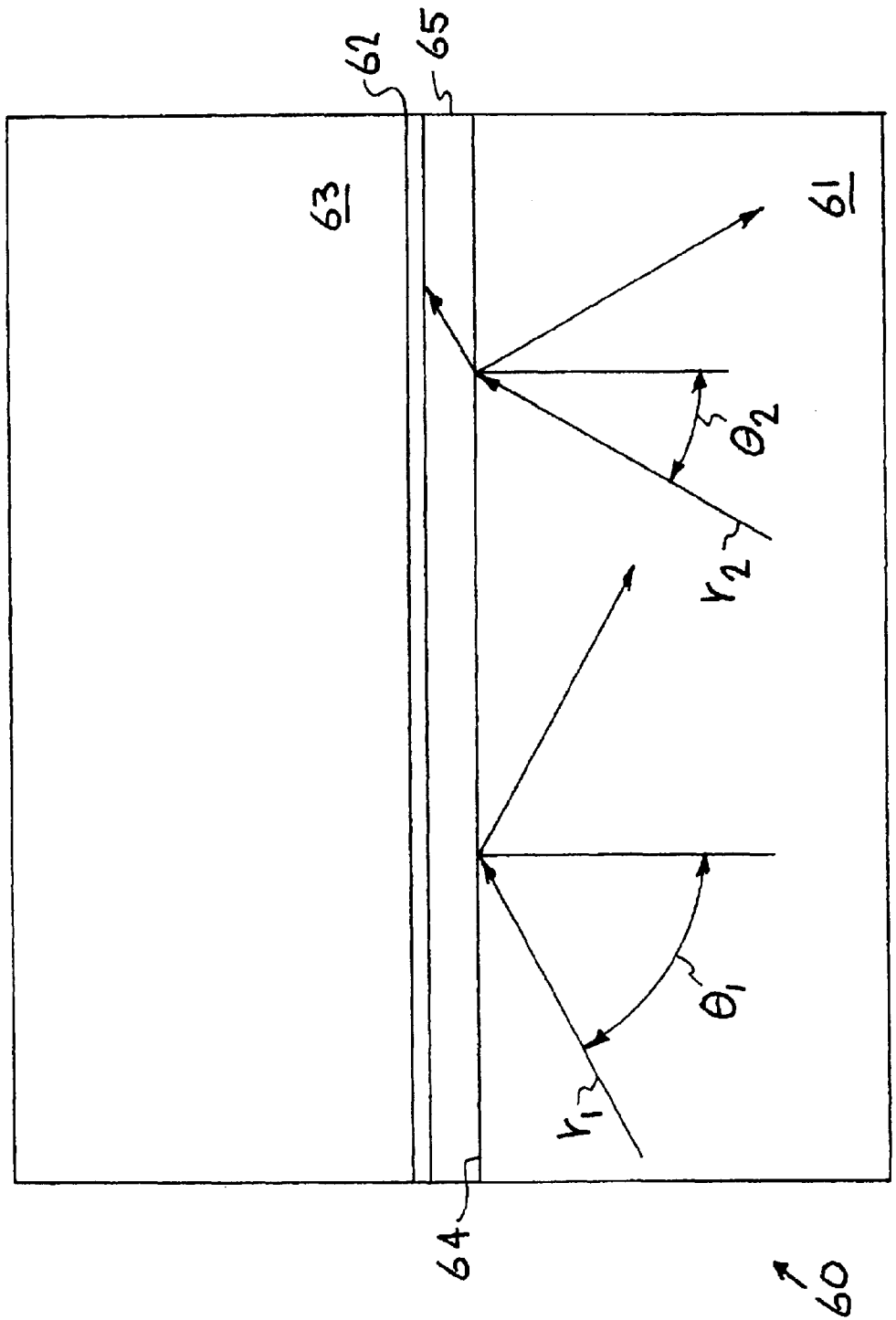
FIG. 4 shows a surface of a laser gain element with incident rays $r_1$ and $r_2$ at angles $\theta_1$ and $\theta_2$ respectively.

Referring now to FIG. 4, a surface 64 of a laser gain element 60 with incident rays $r_1$ and $r_2$ at angles $\theta_1$ and $\theta_2$ respectively is shown. Angle $\theta_1$, which is greater than the critical angle for total internal reflection is completely confined within the laser medium 61 by total internal reflection. This ray is reflected back into the sample with near unity efficiency and can very effectively contribute to amplified spontaneous emission and even parasitic depletion of the laser gain. Angle $\theta_2$, which is smaller than the critical angle for total internal reflection can escape to the absorbing or scattering film 62 beyond the coating 65 with index $n_2$.

The surface 64 of the gain element 61 (with index $n_1$) shown in FIG. 4 has a transparent coating 65 of index $n_2$. For coating thicknesses sufficiently large, angles $\theta_1 > \text{ArcSin}(n_2/n_1)$ are reflected at the gain element/coating interface by total internal reflection. Alternately, rays of angle $\theta_2 < \text{ArcSin}(n_2/n_1)$ are transmitted into the coating.

Figure 5:
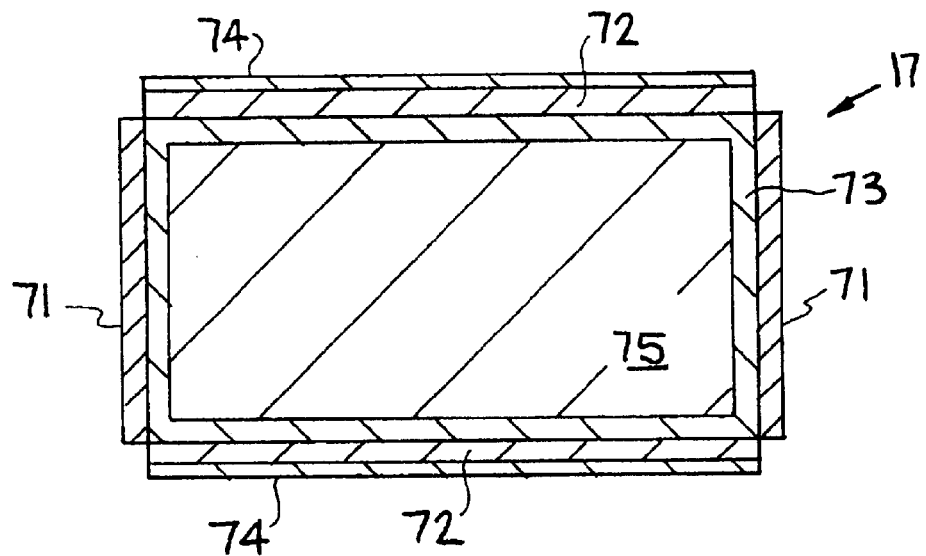
FIG. 5 shows a cross-section of a potential laser slab.

A cross-section of a concept of a laser slab, designated generally by the reference numeral 70, is shown in FIG. 5. The laser slab 75 consists of gain medium of index n1. The laser slab 70 is coated on one or more sides with various coatings that result in low reflection losses for low-angle light rays such as those of the pump light, while resulting in high reflection loss for higher angle light such as parasitic oscillations and amplified spontaneous emission. The coatings shown include low specular reflectivity layer, e.g. BaSO4 coating 71, cooling surface coating 72, low index layer of index n2 (n2<n1) coating 73, and absorbing layer coating 74.

Using transparent optical coatings of controlled index, a laser gain element with total-internal-reflection used to confine pump light while suppressing parasitic oscillations which would otherwise deplete the stored energy has been demonstrated. The index of refraction of the transparent optical coating determines which rays undergo reflection at the interface between the gain element material and optical coating. Rays with angles inside the critical angle for total internal reflection reach the outer surface of the coating. By depositing a diffuse reflectance material such as powdered BaSO4, an absorbing film such as Ge, or roughening the surface to reduce the specular reflectivity, these rays can be absorbed or scattered.

An embodiment of the present invention was demonstrated with a rectangular parallelpiped Yb:YAG slab of dimensions 2.5×3.5×100 mm using $Al_2O_3$ coatings and a combination of India ink and $BaSO_4$ diffuse reflectance material on the outer surfaces. The experiments showed a net gain of 0.8 nepers compared to a predicted value of 0 nepers without the coatings.

In the present invention this second surface of the coating has a low specular reflectivity which prevents the ray from being reflected back into the laser gain element, even if the index of the surrounding medium is such that the ray might otherwise be reflected by total internal reflection. (If the reflection from this other surface is not suppressed, note that rays could still undergo total internal reflection for $n_3 > \text{ArcSin}(n_2/n_3)$ where $n_3$ is the index of the surrounding medium, i.e. coolant). This low specular reflectivity can be obtained by depositing an absorbing medium on top of the coating of index $n_2$, or introducing a surface or medium which scatters incident light. The latter can be obtained by roughening the surface or applying a diffusely scattering material such as particles of $BaSO_4$.

Figure 6:
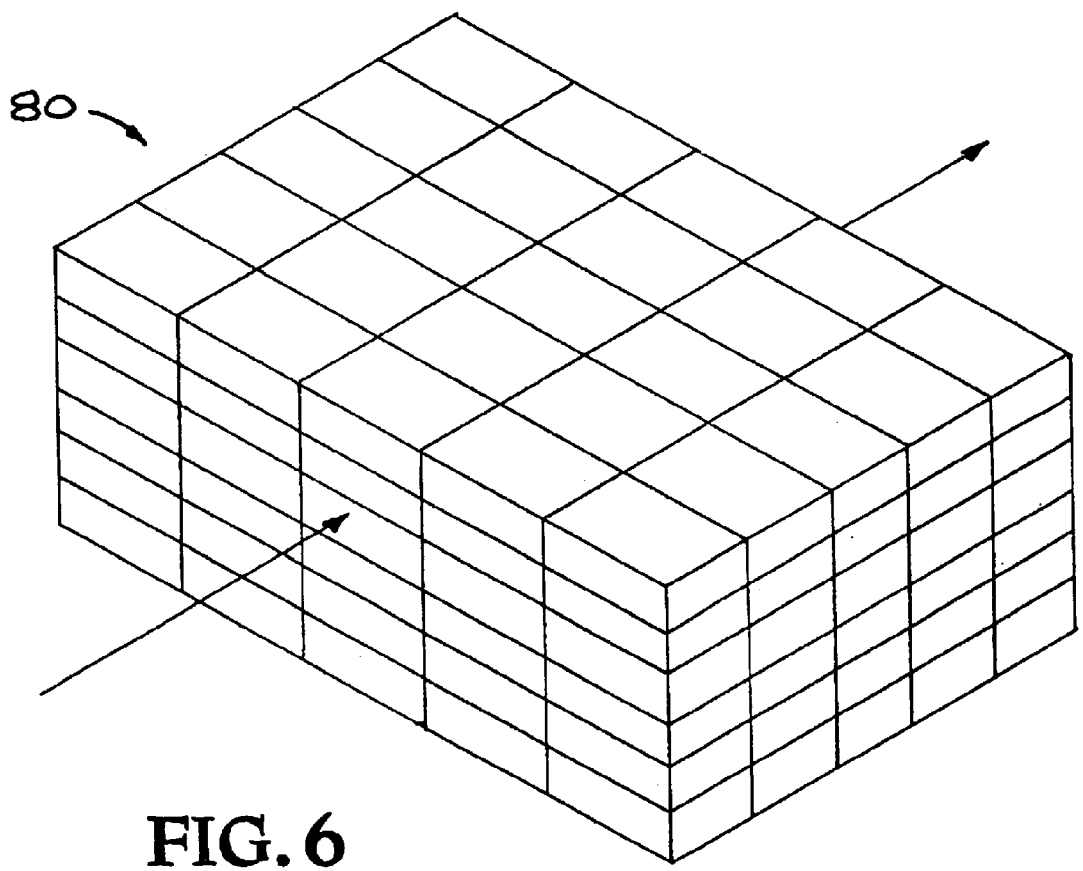
FIG. 6 illustrates a rectangular parallelepiped slab which is surrounded on four sides by a medium of index $n_3$, and index $n_1$ (air) on the remaining two small end faces.

In FIG. 6 a rectangular parallelepiped slab, indicated generally by the reference numeral 80, is surrounded on four sides by a medium of index $n_3$, and index $n_1$ (air) on the remaining two small end faces is shown. For such rectangular parallelepiped samples, the impact of ASE and parasitic lasing can be quickly assessed using the method of images construction. In this construction the rectangular parallelepiped laser sample is repeatedly reflected about all of its faces to generate a tiled structure that fills out all space. The utility of this construction is that it allows the quick calculation on the net gain to loss experienced by rays rattling around in the original sample, confined by reflections at the various sample surfaces. In the method of images construction, rays that remain in the sample due to reflection are simply straight line propagated from the original sample through the various reflecting surfaces into the neighboring image samples and then continue their straight line propagation, i.e., reflections are treated as straight line propagations into the neighboring image sample. In this manor ray directions can be quickly assessed as to their relative gain to loss. As an example, the above technique can be used to assess the loss per unit length experienced by a ray travelling in an arbitrary direction due to partial reflections at the various interfaces as follows, $$\text{loss per unit length} = \frac{\ln(R_x)}{(l_x/\cos(\theta_x))} + \frac{\ln(R_y)}{(l_y/\cos(\theta_y))} + \frac{\ln(R_z)}{(l_z/\cos(\theta_z))}$$

where $R_x$ is the reflectivity seen by the ray on intercepting the faces that have their unit normal in the x-direction, $l_x$ is the length of the sample parallel to the descriptions hold for the y and z surfaces. Evaluating the above expression for if for any direction the gain per unit length is greater than the loss per unit. As a further example we can use the above described method of images analysis to write down a simple expression that will dictate what refractive index is required on the surfaces with unit normals in the x and y directions to completely eliminate the possibility of a zero loss parasitic, i.e., a ray path in which there is TIR (Total Internal Reflection) confinement at every reflective surface. The following conditions must be satisfied for TIR at every interface, $$\cos(\theta_x) < \cos(\theta_{x-crit}) = \frac{\sqrt{n_s^2 - n_c^2}}{n_s}$$

$$\cos(\theta_y) < \cos(\theta_{y-crit}) = \frac{\sqrt{n_s^2 - n_c^2}}{n_s}$$

$$\cos(\theta_z) < \cos(\theta_{z-crit}) = \frac{\sqrt{n_s^2 - 1}}{n_s}$$

where $n_s$ is the refractive index of the laser slab and $n_c$ is the refractive index of the coating on the laser slab surfaces with unit normals along the x and y directions. Since the direction cosines given above satisfy, $$\cos^2(\theta_x) + \cos^2(\theta_y) + \cos^2(\theta_z) = 1.$$

Combining this with the previous TIR condition gives the following condition that must be satisfied to guarantee there will be no zero loss parasitic paths, $$n_c > \sqrt{n_s^2 - \frac{1}{2}}$$

(guarantees there will be no zero-loss parasitic paths).

The utility of the present invention has been demonstrated by ray-trace calculations and experiments on a rectangular parallelepiped Yb:YAG slab laser gain element. For a rectangular parallelepiped slab surrounded on four sides by a medium of index $n_3$, and index $n_1$ (air) on the remaining two end faces, it can be shown that parasitic rays can be completely trapped by total internal reflection (i.e. with zero loss) if $n_3 < (n_1{}^2 - \frac{1}{2})^{\frac{1}{2}}$.

A rectangular parallelepiped slab is surrounded on four sides by a medium of index $n_3$, and index $n_1$ (air) on the remaining two end faces. It can be shown that parasitic rays can be completely trapped by total internal reflection (i.e. with zero loss) if $n_3 < (n_1^2 - \frac{1}{2})^{\frac{1}{2}}$.

For $Y_3Al_5O_{12}$ of index n1=1.82, this critical index for the surrounding medium is $n_3$=1.677. Since common coolants such as water ($n_3$=1.33) have an index much lower, rectangular parallelepiped slabs with polished faces on all six sides are avoided because of the presence of nearly zero loss parasitics which sweep out any stored energy. Note that if we only had to worry about rays in two dimensions, we would simply require that the critical angle for total internal reflection be greater than 45 degrees, i.e. $45 < \text{ArcSin}(n_1/n_3)$. In this way, a ray that was incident at angles θ and 90-θ at the two perpendicular faces and would not undergo total internal reflection at both faces.

An experimental demonstration of the present invention was conducted using a Yb:YAG rectangular parallelepiped slab gain element 2.5×3.5×100 mm, with coatings on the 2.5×100 and 3.5×100 mm sides to suppress parasitics. The 2.5×3.5 mm end faces had antireflection coatings for normal incidence 941 nm pump and 1030 nm amplified light. The coatings are applied to the long faces with dimensions of 3.5×100 mm.

An effort was made to maintain high reflectivity for shallow angles such that the pump light at 941 nm and the laser light at 1030 nm would undergo total internal reflection with zero loss. Therefore, a coating of index only slightly larger than the n=1.677 value was applied in order to maintain reflectivity over the widest range of angles without trapping parasitic rays. Since no standard thin film materials are very near this index, $Al_2O_3$ coatings (n=1.62) was initially used despite its index being slightly below the desired value and then for our second iteration a multilayer of $Al_2O_3$ and $HfO_2$ to yield an effective index of n=1.7 was used. The latter was calculated using a commercially available multilayer thin film computer program (TFCalc).

To suppress the reflectivity of the outer surfaces of the coating, several possible methods were explored. A straightforward method is to apply an absorbing film such as Ge or Cr, although this would result in local heating as fluorescence and ASE is absorbed in the thin coating. Alternately, a diffusely reflecting surface can be obtained by applying a thick layer of nonabsorbing particles of sizes on the order of the wavelength of the incident light. This is the basis for the $BaSO_4$ coating commercially sold by Kodak for diffuse reflectors (e.g. integrating spheres). Also investigated was $Al_2O_3$ and $ZrO_2$ "high temperature paint" which was found to m light. Since the $BaSO_4$ was straightforward to apply most of the experiments used this material. Also investigated was the possibility of obtaining a ground surface finish on the exterior of the parasitic suppression coating. One option investigated was to use ZnS as a soft, layer to be ground, with the harder oxide material as the etch stop.

In a zig-zag slab, only two of the faces are cooled in order to maintain one-dimensional heat flow. On these faces it was decided that absorbing the fluorescence would be the best solution since this could be done with very high efficiency. In this case, the cooled side faces (3.5×100 mm) had the n=1.7 multilayer cladded by an absorbing layer of Ge. The top and bottom faces (2.5×100 mm) of the slab, which are usually insulated in the zig-zag design, had the n=1.7 coating with $BaSO_4$ particles applied to the outer surface.

The calculated reflectivity vs angle at 1030 nm for the 3.5×100 mm faces. Using a He—Ne probe beam, we verified the sharp angular cutoff at the internal angle of ~70 degrees.

The utility of these coatings verified with pulsed gain measurements performed on the Yb:YAG slab. With the coatings, a gain of 0.8 nepers was achieved in a geometry that would otherwise not generate any gain (i.e. 0 nepers).

This approach can also be applied to other laser gain element geometries such as rods. Measurements of the gain profile in our rods with polished barrels indicate the presence of barrel modes trapped in a radius r>r(rod)*n(coolant)/n(YAG).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A laser that controls amplified spontaneous emission and/or parasitic light, comprising:

a laser gain medium having polished surfaces that are used to transport pump light by internal reflection throughout said laser gain medium, a light source directing laser pump light into said laser gain medium, a layered coating on at least some of said polished surfaces that are used to transport pump light by internal reflection of said laser gain medium, said layered coating comprising a first inner material coating layer, said first inner material coating layer comprising a transparent coating, and a second absorptive scattering outside material coating layer, said second absorptive scattering outside material coating layer comprising an absortive layer or a scattering layer or both an absorptive layer and a scattering layer, wherein said layered coating is configured to substantially reflect the pump light that strikes the layered coating so as to direct the pump light back into said laser gain medium, and substantially transmit said amplified spontaneous emission and/or parasitic light that strikes the layered coating so as to let this light strike said outside material coating layer of said layered coating where it is scattered or absorbed or both scattered and absorbed.

2. The laser of claim 1, wherein said absorptive scattering outside material coating layer includes a diffuse reflectance material examples of which include powdered BaSO4, an absorbing film such as Ge, or a roughened surface to reduce the specular reflectivity.

3. The laser of claim 1, wherein said absorptive scattering outside material includes powdered BaSO4.

4. The laser of claim 1, wherein said absorptive scattering outside material coating layer includes a powdered an absorbing film an example of which includes Ge.

5. The laser of claim 1, wherein said absorptive scattering outside material coating layer includes a roughened surface.

6. An end pumped laser, comprising:

a laser light source, a laser gain element, said laser gain element having enter or exit surfaces through which the laser light is intended to enter or exit the gain element and smooth surfaces other than those enter or exit surfaces through which the laser light is intended to enter or exit the gain element, and a layered optical coating applied to said smooth surfaces wherein said smooth surfaces serve to substantially reflect pump light that is introduced into said laser gain element and so keep the pump light confined within said laser gain element, said layered optical coating including an inner coating layer, said inner material coating layer comprising a transparent coating, and an outside material coating layer, said outside material coating layer comprising an absorptive layer or a scattering layer or both an absorptive layer and a scattering layer, wherein said layered optical coating will preferentially transmit amplified spontaneous emission and parasitic light out of said laser gain element and into said outside material coating layer, and said outside material coating layer will scatter or absorb or scatter and absorb amplified spontaneous emission and parasitic light that reaches said outside material coating layer so as to prevent it from re-entering said laser gain element.

7. A method of producing a laser gain element for amplifying laser light, comprising:

providing said laser gain element with enter or exit surfaces through which the laser light is intended to enter or exit the gain element, providing said laser gain element with smooth surfaces other than those enter or exit surfaces through which the laser light is intended to enter or exit the gain element, coating said smooth surfaces with an optical coating so that said smooth surfaces which are in contact with said applied optical coating serve to substantially reflect pump light that is introduced into the gain element and so keep pump light confined within the gain element and wherein the step of coating said smooth surfaces with an optical coating comprises the steps of applying an inner coating layer to said smooth surfaces, said inner coating layer comprising a transparent coating, and applying an outside material coating layer over said inner coating layer, said outside material coating layer comprising an absorptive layer or a scattering layer or both an absorptive layer and a scattering layer, and wherein said optical coating will preferentially transmit amplified spontaneous emission and parasitic light out of the gain element and into said outside material coating layer and wherein said outside material coating layer substantially scatters or absorbs or scatters and absorbs said amplified spontaneous emission and parasitic light that reaches said outside material coating layer so as to prevent said amplified spontaneous emission and parasitic light from re-entering the laser gain medium.

8. The laser method of claim 7, wherein said step of applying an outside material coating layer over said inner coating layer comprises applying an optical coating layer that is a diffuse reflectance material examples of which include powdered BaSO4, an absorbing film an example of which includes Ge, or a roughened surface to reduce the specular reflectivity.

* * * * *